United States Patent
Marks

(10) Patent No.: US 6,914,559 B2
(45) Date of Patent: Jul. 5, 2005

(54) DIRECTION FINDING METHOD AND SYSTEM USING DIGITAL DIRECTIONAL CORRELATORS

(75) Inventor: Maury I. Marks, Bowie, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/665,057

(22) Filed: Sep. 22, 2003

(65) Prior Publication Data

US 2005/0062647 A1 Mar. 24, 2005

(51) Int. Cl.[7] ................................................. G01S 5/02
(52) U.S. Cl. ........................ 342/428; 342/430; 342/445
(58) Field of Search ................................. 342/428, 430, 342/434, 437, 443, 445

(56) References Cited

U.S. PATENT DOCUMENTS

| | | | | |
|---|---|---|---|---|
| 4,134,113 A | * | 1/1979 | Powell | 342/25 R |
| 4,599,622 A | * | 7/1986 | Haupt | 342/427 |
| 4,843,397 A | * | 6/1989 | Galati et al. | 342/59 |
| 4,953,145 A | * | 8/1990 | Carlson | 367/138 |
| 4,967,340 A | * | 10/1990 | Dawes | 712/19 |
| 5,400,037 A | * | 3/1995 | East | 342/372 |
| 6,633,253 B2 | * | 10/2003 | Cataldo | 342/25 R |

* cited by examiner

*Primary Examiner*—Dao Phan
(74) *Attorney, Agent, or Firm*—Lowe Hauptman & Berner LLP.

(57) ABSTRACT

In an interferometer system, a revolving antenna array is used to sufficiently resolve all ambiguities in determination of frequency and direction of arrival of a wave-front. The frequency and direction of arrival are determined by matching predicted phase difference codes with an actual code measured at the antenna array, utilizing a cross-correlation technique. The number of parameters that can be simultaneously uniquely determined by the system depends on if the antenna array is rotated in planar or conical surfaces, and if the cross-correlation is uni- or multi-dimensional. The antenna array may include more than one baselines to enhance the system sensitivity and finding capacity.

12 Claims, 15 Drawing Sheets

DIRECTION FINDING METHOD AND SYSTEM USING DIGITAL DIRECTIONAL CORRELATORS

FIELD OF THE INVENTION

The present invention relates generally to direction finding systems, and in particular, to a digital direction finding method and system utilizing a revolving antenna array.

BACKGROUND OF THE INVENTION

The direction finding of electromagnetic transmission signals has been practiced for many years and has been achieved using a wide variety of antenna configurations and signal processing techniques. One such antenna configuration is a linear array of receiving antennas. Each receiving antenna has its own receiver circuit, and they are configured to simultaneously receive the transmission signal. At long distances, the radiating source appears as a point source, and the transmission signal from the point source appears as a planar wave-front to the linear array of a relatively small length.

The simultaneously received signals from each receiving antenna are processed to determine the phase difference of the received signals between a pair of the receiving antennas (baseline). The measured angle of arrival of the transmission signal is a function of the distances between the receiving antennas in the baseline, the frequency of the transmission signal, and the measured phase difference. Thus, if the distance between the receiving antennas of the baseline is known, and the frequency and the phase differences are obtained through measurements, then the angle of arrival of the transmission signal relative to the array can be determined. If the array position in inertial space is known, then the angular position of the emitter can be determined in any coordinate system.

A system of this type is called an interferometer direction finder. In general, interferometer direction finders are capable of high precision angle of arrival measurements, but the angle measurement has multiple ambiguities caused by the periodic nature of the phase difference.

Conventionally, multiple interferometer baselines must be used to resolve the ambiguities, known as multiple baseline interferometry. In multiple baseline interferometry, different observations of the angle of arrival by several baselines are correlated to remove the ambiguities of the angle of arrival. Disadvantages of this approach are that it requires the space to install multiple antennas, preferably in a coplanar geometry, and it requires extra antenna elements and receiver electronics to process the multiple baseline signals. Moreover, to obtain precision angle measurements for VHF (very high) and UHF (ultra high) frequencies (50 MHz to 200 MHz), a long interferometer baseline is needed. The greater the end-to-end antenna spacing, the more ambiguities are introduced. The greater the number of ambiguities, the greater the number of intermediate antennas which must be added. This represents a large hardware cost and is undesirable, especially, if the antenna array is to be installed in a limited space.

The direction finding problem is also difficult in practical application because the frequency of the incoming signal typically is not known before its reception at the direction finding system. In fact, the direction finding system may be required to operate over a very broad frequency band and an incoming signal may lie anywhere within the band. An approach in such a case is to implement the direction finding system as a channelized device and employ digital channelizers to divide the broad frequency band at each antenna into a number of plural frequency channels (each narrower than the broad frequency band) to be processed individually. The main problem with this approach is that a relatively large number of digital channelizers are required, i.e., one for each antenna.

The direction finding system can be combined with a parameter encoder system which measures various parameters including frequency, pulse width, etc. of the transmission signal. Alternatively, the signals received at the receiving antennas can be converted through a Fourier transformation, followed by a phase-sequence analysis to determine the transmission signal frequency. Again, additional external devices or processing circuits are necessary.

Moreover, if the direction finding antennas are broadband, the angular coverage of the arrays is typically 90° (spatially) and four such arrays are needed to cover fully 360°.

Thus, there is a need for direction finding method and system capable of determining the angle of arrival with high accuracy using as few antennas as possible, and requiring no dedicated circuit for the signal frequency determination.

SUMMARY OF THE INVENTION

It is an object of the present invention to provide direction finding method and system which are capable of determining the angle of arrival of a wave-front with high accuracy using a few antenna elements, and requiring no dedicated circuit for the signal frequency determination. The method and system of the present invention are especially suitable for detecting distant radiating sources in the RF frequency bands.

It is a further object of the present invention to provide direction finding method and system which determines both frequency and direction of arrival by virtue of the cross-correlation processing technique.

These and other objects of the present invention are achieved by a method of detecting a wave-front, comprising the steps of measuring a first relational phase between signals induced by the wave-front in first and second antenna elements of an antenna array at a first spatial position. The antenna array is then moved to a second spatial position and a second relational phase is measured again. This process is repeated until all ambiguities have been resolved and the angle of arrival and frequency of the wave-front can be determined.

The above and other objects of the present invention are further achieved by a direction finding method using a non-stationary antenna array. In accordance with the method, a set of antenna array spatial positions and relational phases between signals induced in the antenna array is predicted for each potential value of at least one parameter of a wave-front. Then, while the antenna array is moved through a plurality of spatial positions, actual relational phase at each of the spatial positions is measured to generate a set of measured spatial positions and relational phases. Finally, the measured set is compared with each of the predicted sets to find a best-matching predicted set and thus the ambiguities are resolved.

The above direction finding method of the invention can be implemented by hardware, software or both. In a hardware implementation, a directional correlation system of the invention comprises an antenna array; a steering mechanism for moving the antenna array; a receiver for measuring a relational phase therebetween antenna elements of the antenna array; and a correlator for determining a parameter of a wave-front incident to the antenna array.

The correlator includes a memory for storing predicted relational phases, that are expected to be found in the antenna array, in a plurality of memory cells each being associated with a potential value of the parameter to be determined. An encoder is provided to shift contents of the memory cells corresponding to the movement of the antenna array. A set of comparators are coupled to receive outputs of the receiver and access selected memory cells for matching the measured relational phase fed by the receiver with the content of the selected memory cells. A set of counters are provided to count a number of matches for each memory cell during the movement of the antenna array. A threshold detector is coupled to outputs of the counters for determining the memory cell the content of which matches best with the measured relational phase, thereby determining the parameter of the wave-front.

In accordance with an aspect of the invention, the antenna array may comprise more than one baseline.

In accordance with another aspect of the invention, the steering mechanism rotates the antenna array in either planar or conical surfaces.

In the former case, the system can determine the frequency and direction of arrival of the plane wave-front whose normal lies in the plane of rotation of the antenna arrays. If the normal to the wave-front is inclined to the plane of rotation, then the system can determine the angle of arrival of the projection of the normal on the plane of rotation, and one of the frequency of the wave-front and the angle of inclination, provided that the other is known.

In the later case, frequency, azimuth and elevation angles can all be uniquely determined.

In accordance with a further aspect of the invention, the correlator is a multi-dimensional correlator. In one instance, the multi-dimensional correlator comprises a column (or row) of uni-dimensional correlators. In another instance, the multi-dimensional correlator comprises a matrix of uni-dimensional correlators.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 1:
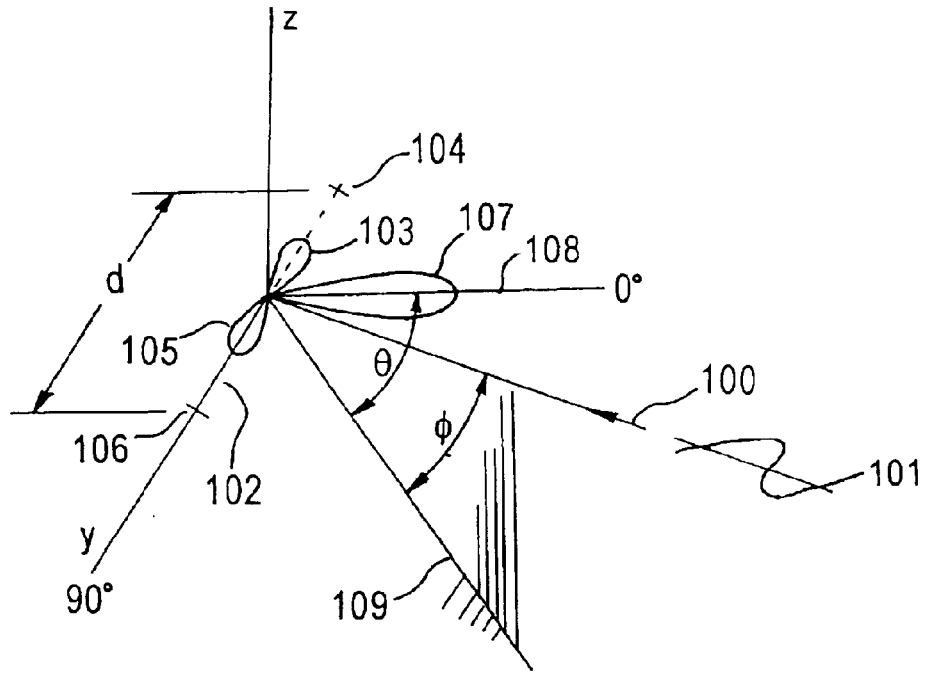
FIG. 1 is basic geometry showing the orientation of an electromagnetic wave-front relative to an antenna baseline.

Direction finding method and system according to the present invention are described. In the following detailed description, for purposes of explanation, numerous specific details are set forth in order to provide a thorough understanding of the present invention. It will be apparent, however, that the present invention may be practiced without these specific details. In other instances, well-known structures and devices are shown in block diagram form in order to simplify the drawing.

1. Mathematical Background

FIG. 1 is basic geometry showing the orientation of an electromagnetic wave-front 101 having a normal 100. Antenna array 102 comprises two receiving antennas 104, 106 spaced apart a known distance d to form a baseline of antenna array 102. The relative electrical phase, or phase difference, ψ, of the voltages induced in receiving antennas 104, 106 by the wave-front 101 is given by the following equation:

$$\psi = \frac{2\pi d}{\lambda}\cos\phi\sin\theta \qquad (1)$$

where ψ is the relative electrical phase in radians,
    d is the end-to-end spacing between receiving antennas 104, 106,
    λ is the wavelength of wave-front 101,
    φ is the elevation angle, and θ is the azimuth angle of normal 100 with respect to the azimuth plane which is also the horizontal plane in this particular example.

For sake of simplicity, the antenna array 102 is shown in FIG. 1 to have a boresight direction 108 which is coincident with axis x. The boresight direction of an antenna array is the direction of strongest radiation in the polar pattern. As depicted in FIG. 1, azimuth angle θ is measured between the boresight direction 108 and the radiation direction (projection 100) in the horizontal plane. Likewise, elevation angle φ is measured between the normal 100 and its projection 109 in the horizontal plane.

Equation (1) can be rewritten in a normalized form to obtain equation (2).

$$\psi = 2\pi s(1+k)\cos\phi \sin\theta \quad (2)$$

where $d = s\lambda_0$, and $$\frac{1}{\lambda} = (1+k)\frac{1}{\lambda_0} \text{ or } f = (1+k)f_0, f \text{ is the frequency of wave-front 101.}$$

Thus "s" represents the end-to-end spacing of receiving antennas 104, 106 in wavelengths of a reference wavelength $\lambda_0$, and (1+k) represents the frequency of electromagnetic wave-front 101 in units of the reference frequency $f_0$ which corresponds to wave length $\lambda_0$.

If phase difference ψ is digitized (quantized) to obtain an integer N satisfying $0 \leq N \leq 2^n - 1$, where n is an integer representing the number of quantization bits, then equation (2) can be rewritten to obtain equation (3)

$$N = Int\lfloor (2^n s(1+k)\cos\phi \sin\theta) Modulo 2^n \rfloor \quad (3)$$

where N is the integer part of the term in brackets.

Since sin θ can have both positive and negative values, and N is defined as a positive integer, negative remainders in the modulo operation must be increased by the addition of $2^n - 1$. Equations (4.1) and (4.2) describe the value of N for θ ranging from zero to 360 spatial degrees, and φ ranging from −90 degrees to +90 degrees.

$$N = Int\lfloor (2^n s(1+k)\cos\phi\sin\theta) Modulo 2^n \rfloor, \text{ for } \sin\theta \geq 0 \quad (4.1)$$

$$N = 2^n - 1 - Int\lfloor (2^n s(1+k)\cos\theta|\sin\theta|) Modulo 2^n \rfloor, \text{ for } \sin\theta < 0 \quad (4.2)$$

Figure 3:
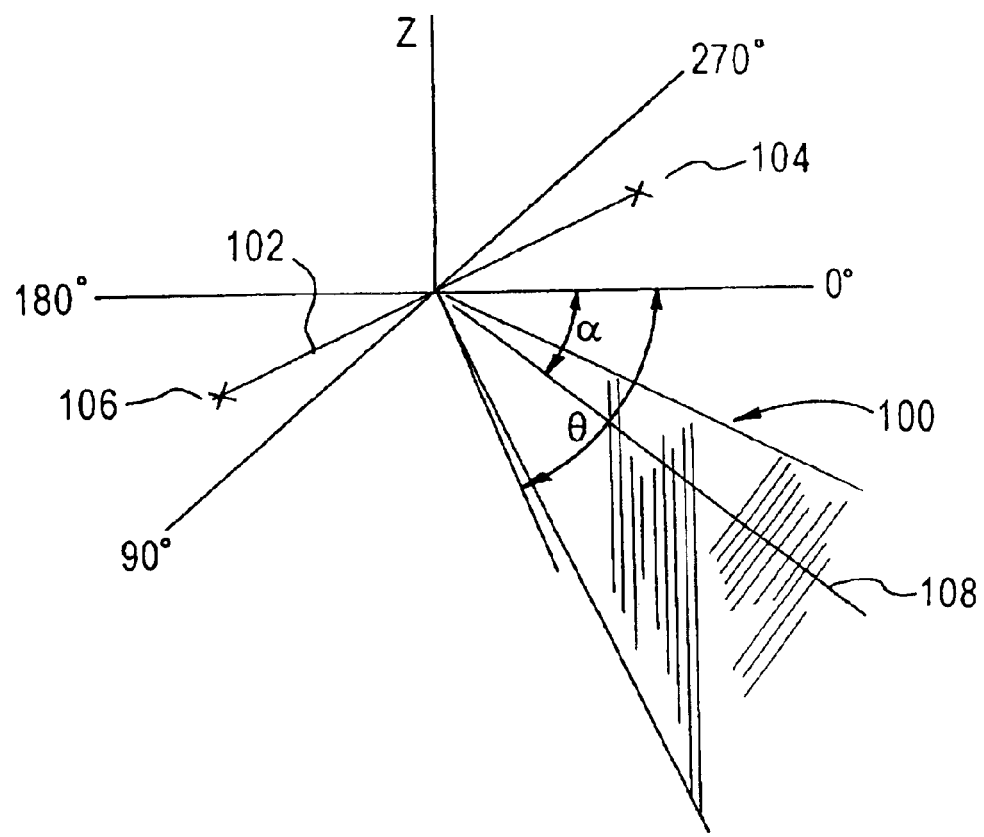
FIG. 3 is rotating array geometry showing the orientation of the electromagnetic wave-front of FIG. 1 relative to the antenna baseline when the antenna baseline rotates for an angular interval.

The foregoing discussion is true with the conventional stationary interferometer. The present invention, in contrast, involves revolving antenna arrays to resolve the ambiguities encountered in determination of the frequency and direction of arrival of a wave-front. FIG. 3 is rotating array geometry showing the orientation of electromagnetic wave-front 101 relative to antenna array 102 which is at an angular interval a with respect to the zero azimuth direction. Then, azimuth angle θ in equations (1) through (4) must be replaced by (θ−α). Equation (4) can be written in functional form to obtain equation (5)

$$N = g[(1+k)\cos\phi \sin(\theta - \alpha)] \quad (5)$$

Equation (5) is easily modifiable for other types of planar movement, such as linear movement or combination of linear and rotating movements. It should also be understood that the azimuth plane is not necessarily a horizontal plane (parallel to ground surface).

Equation (5) states that the number N (or phase difference ψ) is related to the values of k (or frequency f), elevation angle φ, azimuth angle θ and angular interval α (or the spatial position of antenna array 102). Equation (5) is ambiguous in the sense that there is more than one set of values of k, φ, θ and α which correspond to each value of N.

2. Rotating the Interferometer to Determine the Wave-Front Parameters

The primary object of a direction finding system is to deduce the wave-front parameters (θ, φ, k) from measurements on the system. Let $U = (1+k)\cos\phi$ then equation (5) becomes $$N = g[U \sin(\theta - \alpha)] \quad (6).$$

The discussion will be restricted in the following section to a single distant pulsed radiating source which produces wave-front 101 at the interferometer or antenna array 102. The discussion will then be extended to a multiplicity of radiating sources.

As antenna array 102 rotates, angular interval a and digitized phase difference N are measured. If there were no ambiguities, two measurements would be enough to determine azimuth angle θ and intermediate variable U (i.e. two equations and two unknowns). However, because each pair of values (N, α) may correspond to many pairs of values of (θ, U), a great many pairs of values (N, α) must be collected to determine uniquely actual values (θ, U). From equation (6), the set of values [N,α] can be predicted for each $(\theta_x, U_y)$. Thus, there will be a particular set $$\begin{bmatrix} N_1 & á_1 \\ N_2 & á_2 \\ \ldots & \ldots \\ N_r & á_r \\ \ldots & \ldots \\ N_n & á_n \end{bmatrix}_{x,y}$$

corresponding to each $(\theta_x, U_y)$, where r=1, 2, ..., n. Each $N_r$ will range from 0 to $2^n - 1$, and each $\alpha_r$ will range from 0° to 360°.

Figure 4:
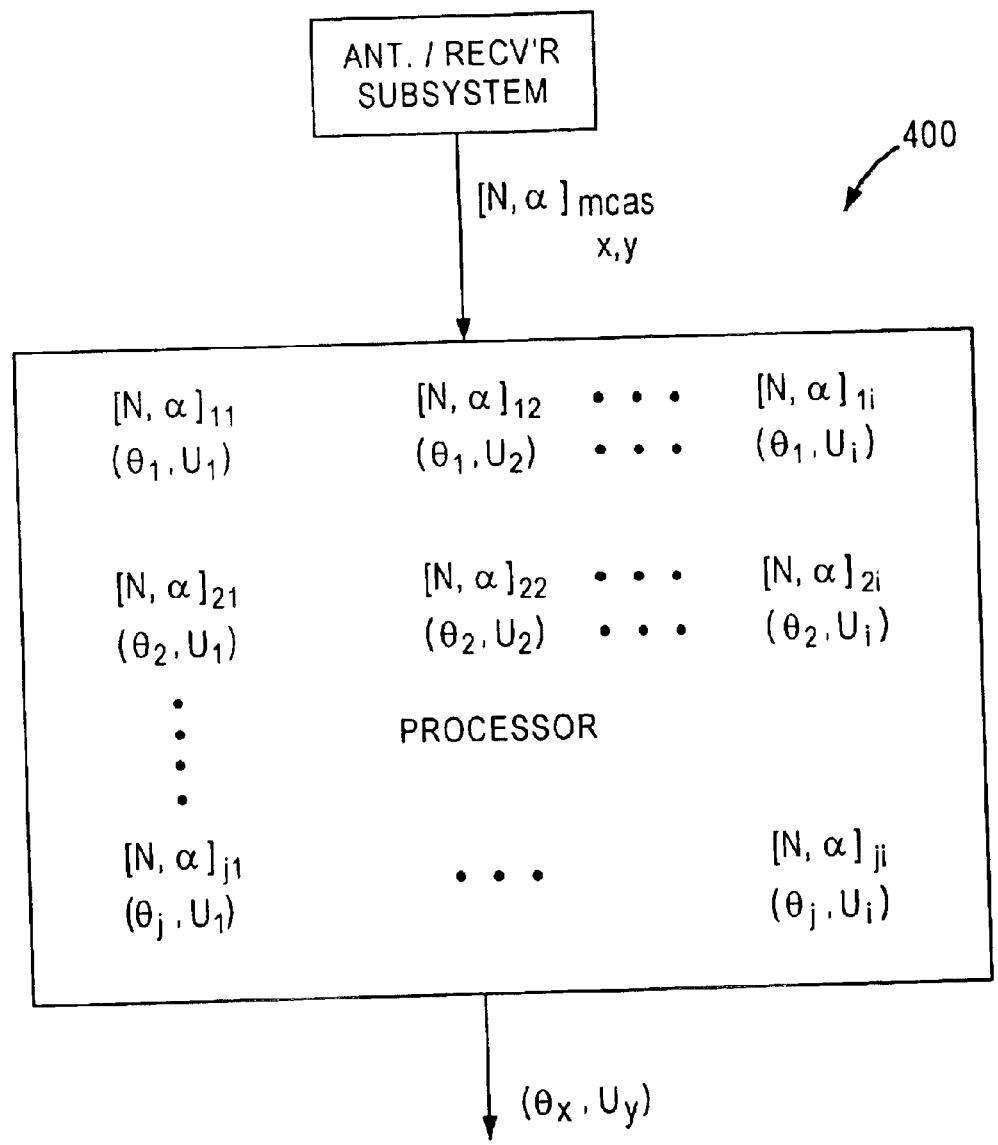
FIG. 4 is a conceptual processor for use in the system of the present invention.

A processor 400 (shown in FIG. 4) can be conceived for which each $(\theta_x, U_y)$ (where x=1, 2 ..., i; and y=1, 2 ..., j) a set $[N,\alpha]_{x,y}$ is predicted from equation (6) and stored. As antenna array 102 rotates, the direction finding system measures the electrical phase difference ψ and outputs a quantized value N corresponding to each antenna spatial position, α, for which a signal from the radiating source has been received. The measured set of values $[N,\alpha]_{meas}$ is compared against each of the stored set of values $[N,\alpha]_{stored}$. The particular set of stored values $[N,\alpha]_{x,y}$ for which the best match is obtained will correspond to the wave-front parameters $(\theta_x, U_y)$. A best match is defined as that set $[N,\alpha]_{stored}$ which has the most members which match the set of measured values $[N,\alpha]_{meas}$.

Since $U = (1+k)\cos\phi$, k or frequency f must be known to determine elevation angle φ and vice-versa. Thus, the described processor 400 can determine azimuth angle θ and frequency φ, or azimuth angle θ and elevation angle φ. The interferometer may be tuned to a specific frequency band such that the system will respond only to that frequency band. Then elevation angle φ and azimuth angle θ may be determined. Alternatively, antenna array 102 may be so designed and so oriented such that the system will respond to signals arriving at a particular elevation angle φ. In this case, frequency φ and azimuth angle θ can be determined.

3. System Design

Figure 5:
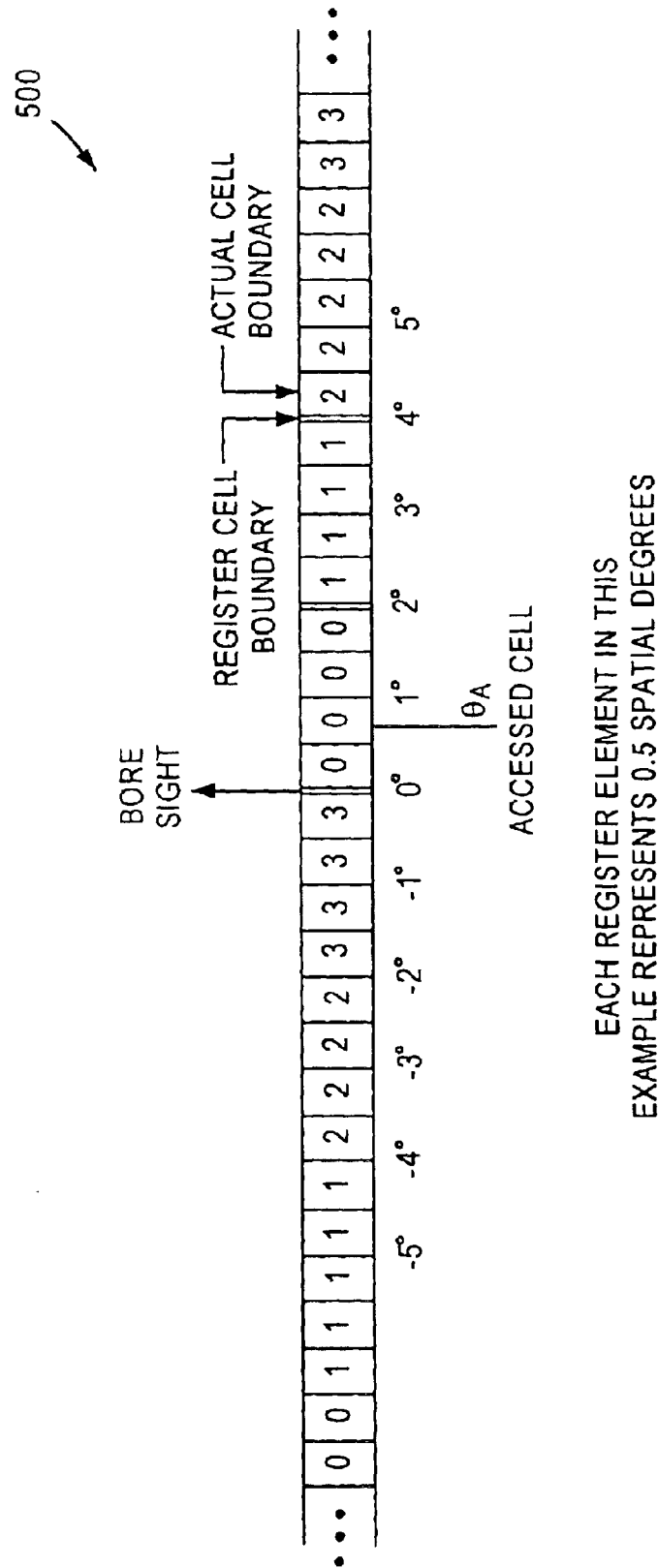
FIG. 5 is an implementation of the conceptual processor shown in FIG. 4.

One way of implementing processor 400 is through the use of a shift register structure 500 illustrated in FIG. 5. Consider the case where a multiplicity of pulsed emitters are all at the same (or nearly the same) elevation angle and the same (or nearly the same) frequency. That is, the emitters in this particular example all have the same (or nearly the same) value of U. It is desired to determine their azimuthal direction through the use of the rotating interferometer.

Equation (6) shows that the set [N,α] can be predicted for an emitter at any azimuth angle θ since "U" is established. Register structure 500 of FIG. 5 shows how this information may be stored in processor 400. In FIG. 5, each cell of register 500 represents 0.5° in azimuth. With the interferometer boresight direction at 0° as shown, the value of N for an emitter at any azimuth angle is stored in register 500 within the limits of resolution determined by the quantum steps of 0.5°. Thus the transition from one value of N to the next value of N can be represented to within ±0.25° for register 500 of FIG. 5.

As the interferometer rotates, the code will be shifted from cell to cell in concert with the rotation. Every time the boresight direction of antenna array 102 changes by 0.5°, each value stored in a cell will be shifted into the adjacent cell in the direction of the boresight change. If the value contained in a particular cell is accessed as shown in FIG. 5, then the set of values produced by the shifting action described previously, coupled with the antenna boresight position, will describe the set [N,α] for the particular register cell ($\theta_A$) that is accessed. Therefore, if a multiplicity of register cells are accessed, a multiplicity of sets [N,α] can be generated, each corresponding to a different azimuth angle θ.

Figure 6:
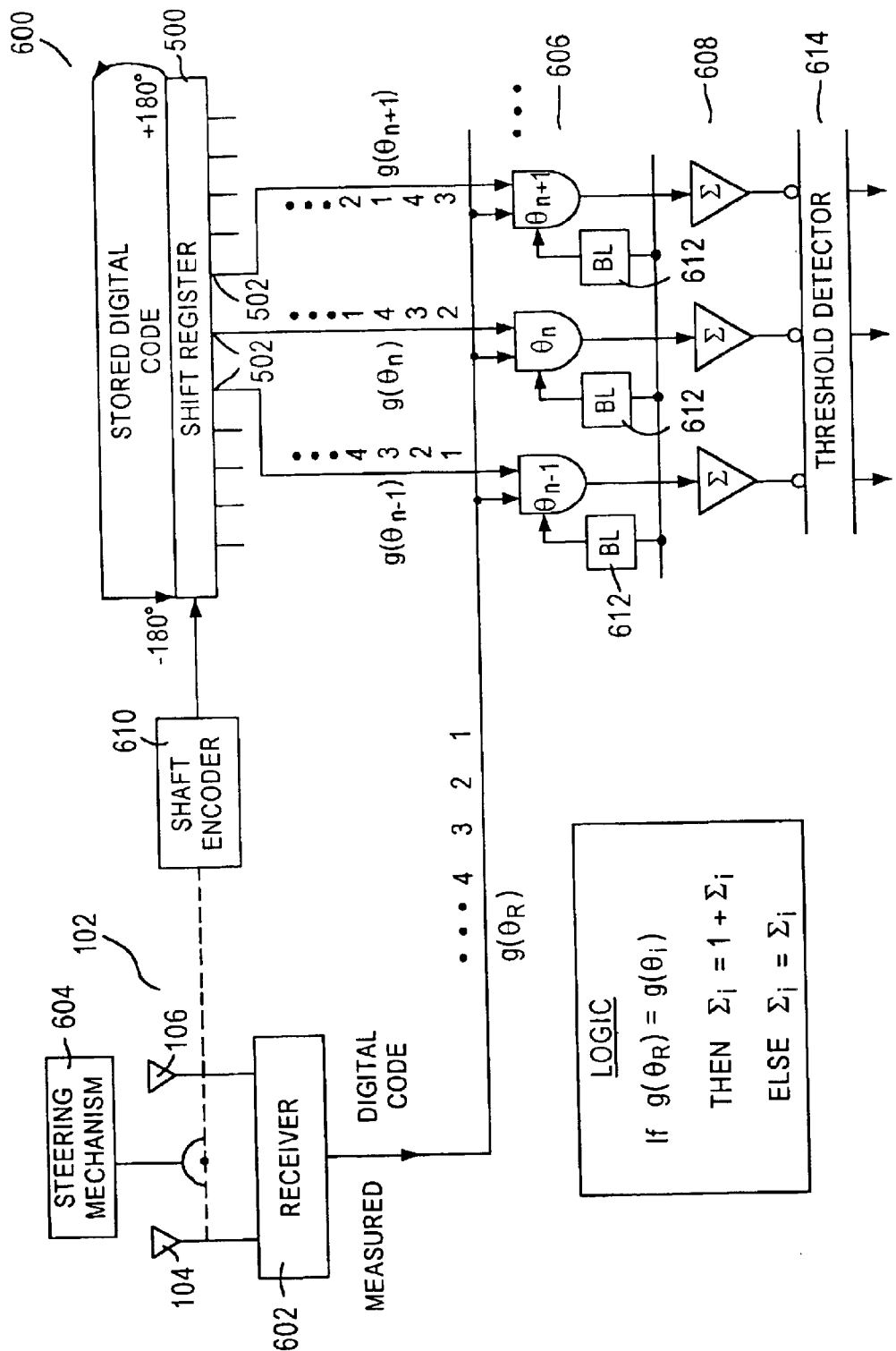
FIG. 6 is a schematic diagram of an embodiment of the system of the present invention using the implementation illustrated in FIG. 5.

FIG. 6 shows a possible embodiment of the system of the present invention using register structure 500 shown in FIG. 5.

Figure 2:
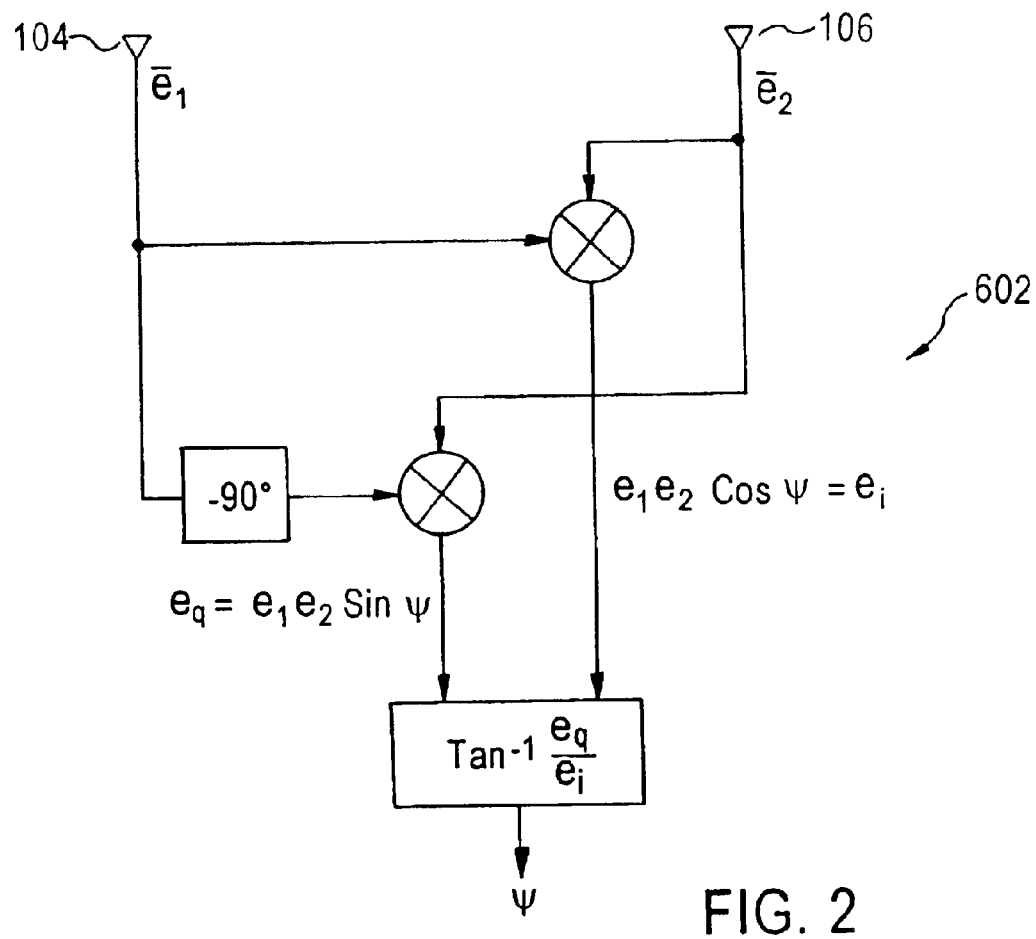
FIG. 2 is a schematic diagram of an exemplary interferometric phase measurement circuit which can be used in the system of the present invention.

Phase difference ψ of the rotating interferometer 600 is measured by receiver 602. Receiver 602 can be any device available in the art which is capable of measuring the phase difference between signals induced in receiving antennas 104, 106. An exemplary principle schema of receiver 602 is illustrated in FIG. 2. Receiver 602 may further comprise a digitizer (not shown) which produces a digital code $N_R$ or $g(\theta_R)$ of the measured phase difference, wherein $\theta_R$ represents the azimuth angular position of the emitter.

Antenna array 102 of rotating interferometer 600 is rotated by a steering mechanism 604 which can be any device available in the art. Rotating interferometer 600 may also include an encoder 610 for shifting the content of shift register 500 according to the rotation of antenna array 102. Preferably, encoder 610 is coupled with steering mechanism 604.

Shift register 500 has the entire code pattern stored in it for 360° of azimuth. Shift register 500 is accessed at various cells 502 corresponding to specific azimuth angular positions of the emitter (e.g. $\theta_n$, $\theta_{n-1}$, . . . ). The received phase difference or code $g(\theta_R)$ is compared against the stored codes $g(\theta_1)$ for all accessed cells 502. For example, if cells 502 were accessed every 2°, there would be 180 lines coming from register 500 feeding 180 AND gates 606. The code for each received pulse would be compared simultaneously with the code at each AND gate 606. Wherever a match occurs between the received code $g(\theta_R)$ and the stored codes $g(\theta_1)$, the corresponding counter 608 is incremented by one count. Apparently, the counters may be configured as reverse counters. If at least one pulse were received from an emitter for each of the 0.5° shift register cells over 360°, then the counter at the output of the AND gate corresponding to the emitter's azimuth angular position would have a total count of 720. In this particular example, AND gates 606 function as comparators.

It should be understood that once a match occurs at a particular AND gate 606, that AND gate must be locked until the antenna array position changes, and data in shift register 500 also changes by at least one cell shift. This is important because counters 608 is simply recording the fact that for a given orientation of the antenna array, the received code matched the stored (reference) code. Repeated pulses from the emitter when the antenna array position has not changed merely affirm this condition, add no new information and must be locked out. For this purpose, a blocking circuits 612, which can be any device and connected to each AND gates 606 in any manner available in the art, is provided. For example, blocking circuit 612 may feed output signals to an AND gate 606 to optionally enable/disable the AND gate 606 as desired.

Once one (or more) of counters 608 reaches a specified level (at, or near the maximum count, i.e., about 75%), a threshold detector 614 is actuated and an emitter is declared present at the azimuth angular position corresponding to the counter 608 in question. Because the phase difference code is ambiguous, more than one AND gate 606 will have a match between the received code from a particular emitter pulse and the stored codes. Thus some counters 608 will have counted to some value less than the count in the counter corresponding to the emitter's azimuth angular position.

It is important to note that the term "shift registers" and "AND gates" used in the foregoing description are in general meant to be generic terms, and are accurate descriptors only for the case where n=1 (1 bit). For the case where n>1, both terms, "shift registers" and "AND gates" mean multibit devices, which perform the indicated operations on multibit words.

Figure 16:
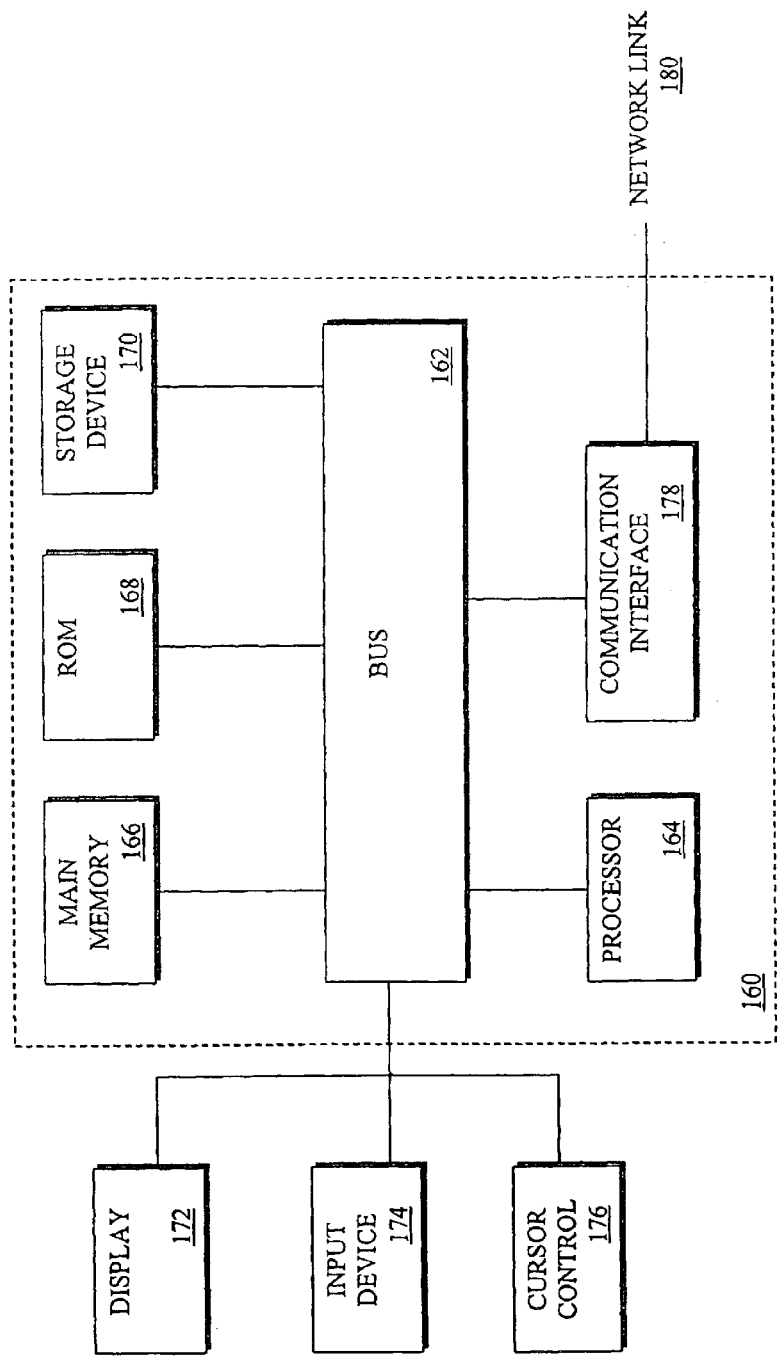
FIG. 16 is a high-level block diagram illustrating an exemplary computer system with which the present invention can be implemented.

The process described above is a cross-correlation between the received code and the codes stored in shift register 500. It should be understood that shift register 500 is just one hardware implementation of processor 400 and other arrangements of processor 400 are also available. For example, any of shift register 500, AND gates 606, counters 608, blocking circuit 612 and threshold detector 614 can be implemented as a piece of software executed in a compliant computer environment. In a pure software embodiment, processor 400 may be implemented in form of a multi-dimensional table or database which stores for each potential value of azimuth angle θ a set $[N,\alpha]_{stored}$. The measured set of values $[N,\alpha]_{meas}$ is compared against each of the stored set of values $[N,\alpha]_{stored}$ to find the best match stored set. The table or database can be accommodated within an ordinary computer system such as an exemplary computer system 160 shown in FIG. 16.

Computer system 160 includes a bus 162 or other communication mechanism for communicating information, and a processing unit 164 coupled with bus 162 for processing information. Computer system 160 also includes a main memory 166, such as a random access memory (RAM) or other dynamic storage device, coupled to bus 162 for storing information and instructions to be executed by processing unit 164. Main memory 166 may also be used for storing temporary variables or other intermediate information during execution of instructions to be executed by processing unit 164. Computer system 160 further includes a read only memory (ROM) 168 or other static storage device coupled to bus 162 for storing static information and instructions for processing unit 164. A storage device 170, such as a magnetic disk or optical disk, is provided and coupled to bus 162 for storing information and instructions.

Computer system 160 may be coupled via bus 162 to a display 172, such as a cathode ray tube (CRT) or a flat panel display, for displaying information to a computer user. An input device 174, including alphanumeric and other keys, is coupled to bus 162 for communicating information and command selections to processing unit 164. Another type of user input device is cursor control 176, such as a mouse, a trackball, or cursor direction keys for communicating direction information and command selections to processing unit 164 and for controlling cursor movement on display 172. This input device typically has two degrees of freedom in two axes, a first axis and a second axis allowing the device to specify positions in a plane.

According to one embodiment of the invention, a variety of information and services are provided by computer system 160 in response to processing unit 164 executing sequences of instructions contained in main memory 166. Such instructions may be read into main memory 166 from another computer-readable medium, such as storage device 170. However, the computer-readable medium is not limited to devices such as storage device 170. For example, the computer-readable medium may include a floppy disk, a flexible disk, hard disk, magnetic tape, or any other magnetic medium, a CD-ROM, DVD-ROM, or any other optical medium, punch cards, paper tape, or any other physical medium with patterns of holes, a RAM, a PROM, an EPROM, a FLASH-EPROM, or any other memory chip or cartridge, a carrier wave embodied in an electrical, electromagnetic, infrared, or optical signal, or any other medium from which a computer can read. Execution of the sequences of instructions contained in main memory 166 causes processing unit 164 to perform the process steps described below. In alternative embodiments, hard-wired circuitry may be used in place of or in combination with computer software instructions to implement the invention.

Computer system 160 also includes a communication interface 178 coupled to bus 162. Communication interface 178 provides a two-way data communication as is known. For example, communication interface 178 may be an integrated services digital network (ISDN) card, a digital subscriber line (DSL) card, a cable modem, or a telephone modem to provide a data communication connection to a corresponding type of communication line. As another example, communication interface 178 may be a local area network (LAN) card to provide a data communication connection tion are not limited to any specific combination of hardware circuitry and software. to a compatible LAN. Wireless links may also be implemented. In any such implementation, communication interface 178 sends and receives, through a data communication connection 180, electrical, electromagnetic or optical signals which carry digital data streams representing various types of information. Of a particular note, the communications through interface 178 may permit transmission or receipt.

In an embodiment of the invention, interface 178 of computer system 160 is coupled to received measured data set $[N,\alpha]_{meas}$ from receiver 602 and steering mechanism 604. Then, a dedicated software can be executed to match the received code with the stored codes. Thus, the fields of the table or database function as the cells or memory cells of register 500.

In another embodiment, measured data set $[N,\alpha]_{meas}$ observed by receiver 602 and steering mechanism 604 may be temporarily stored in a removable storage media, such as a floppy disk of CDROM, and transferred later to computer system 160 for processing.

One important factor in a cross-correlation process is the main lobe-to-side-lobe ratio.

Figure 7:
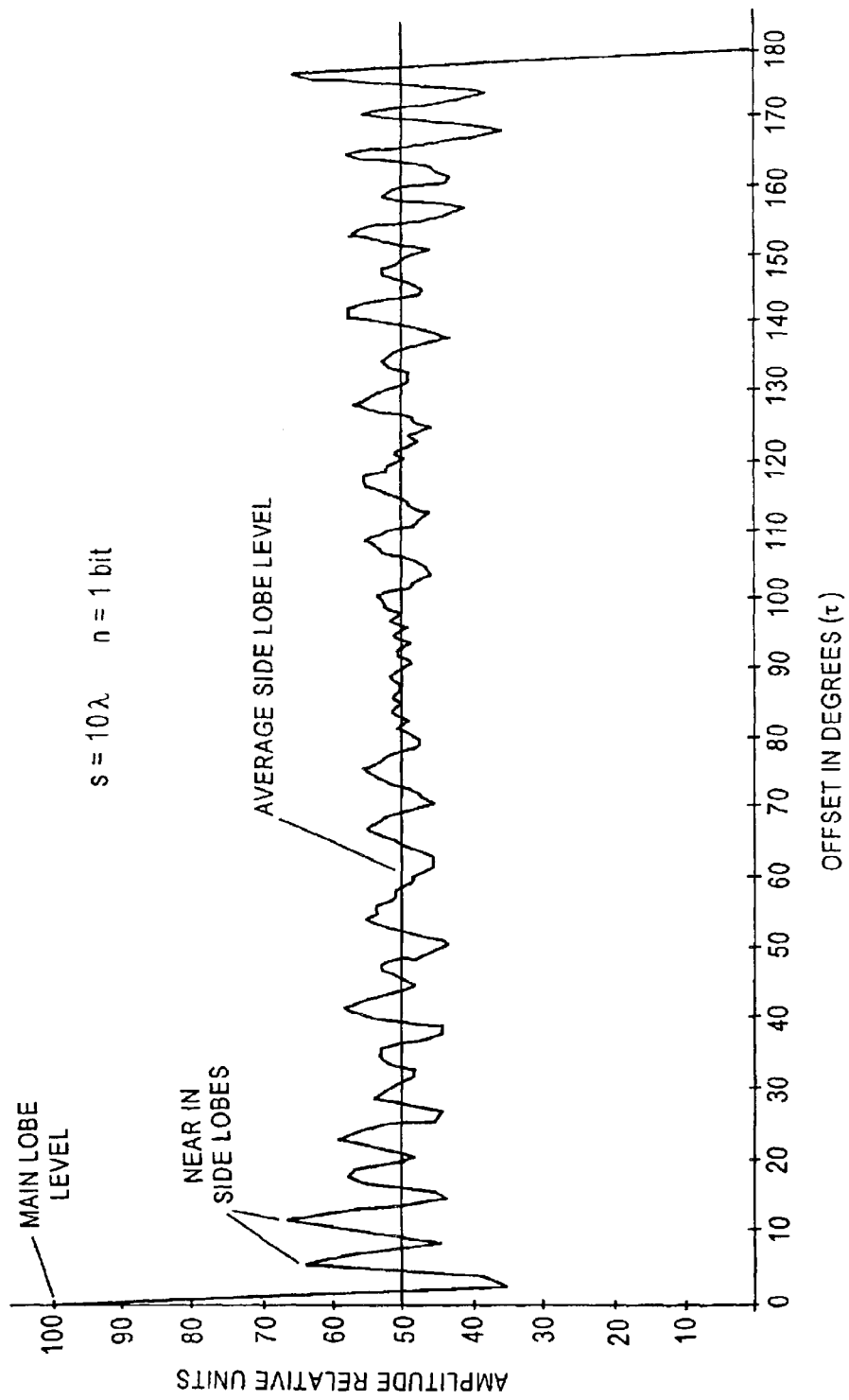
FIGS. 7–10 are graphs showing the auto-correlation function for various numbers of quantization bits.
Figure 8:
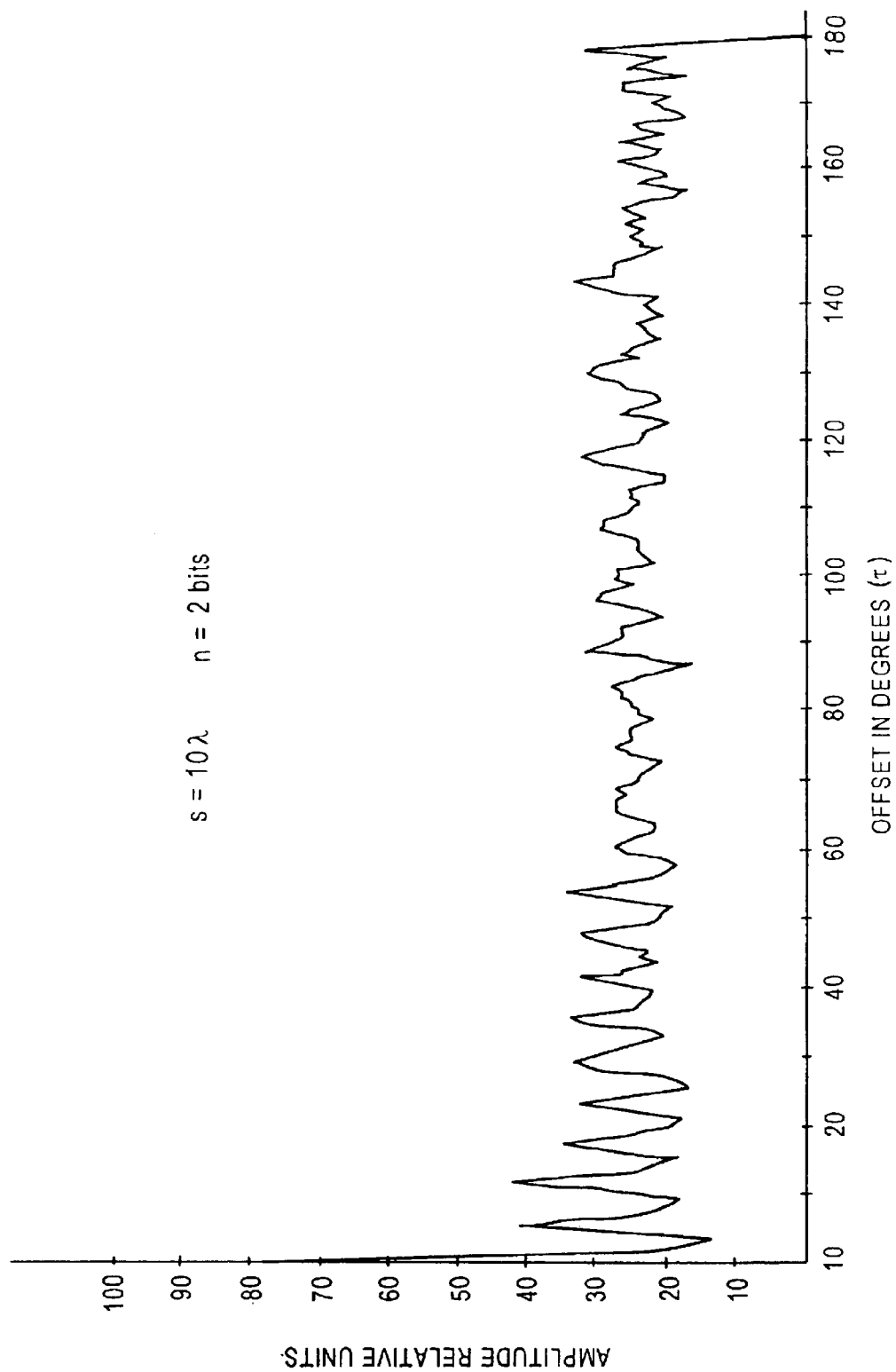
Figure 9:
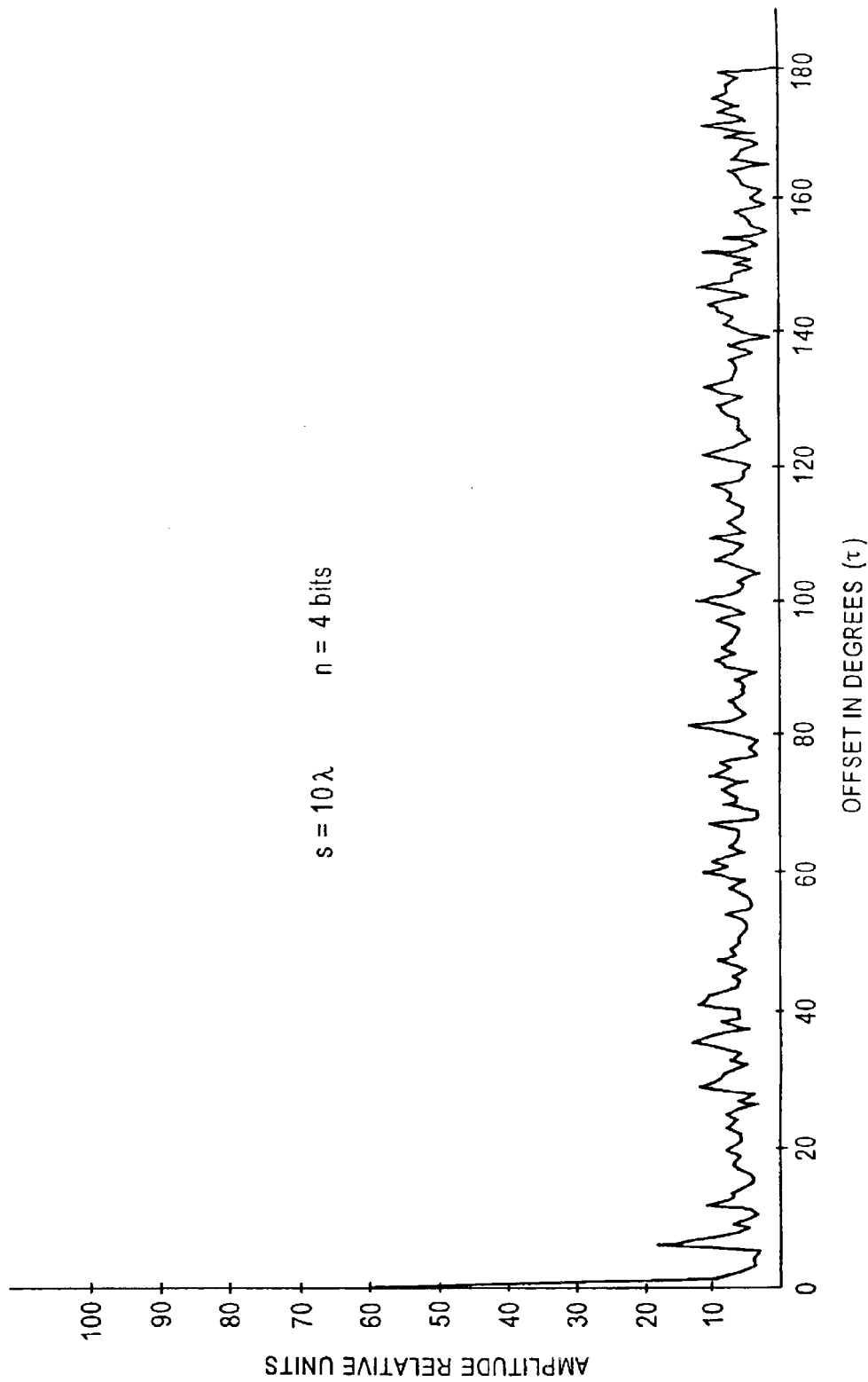

FIG. 8 shows the auto-correlation function for n=2, and FIG. 9 shows the auto-correlation function for n=4 bits. In each case the side lobe level is on the order of $$\frac{1}{2^n}$$

of the main lobe level. Since the code is not a perfectly random function, and seems to repeat itself every 360 electrical degrees (repetition is not exact because of the factor $\sin(\theta-\alpha)$ in equation 5), the near-in side lobes exceed the average value by a goodly margin, as can be seen in e.g. FIG. 7.

Figure 10:
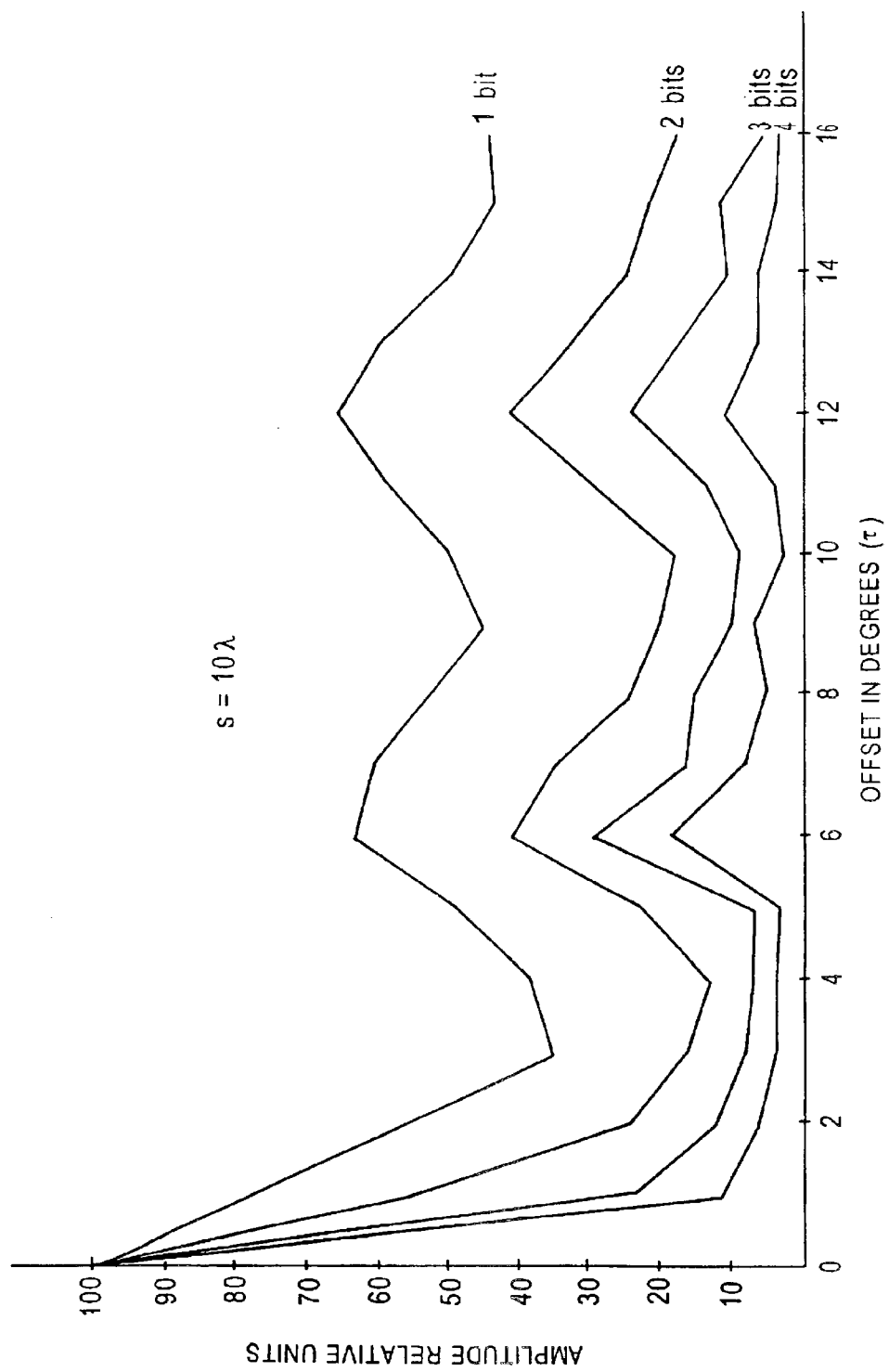

FIG. 10 shows the behavior of the main lobe and the first few side lobes as a function of n. The main lobe becomes narrower as n increases.

If more than one emitter were present, then the counter corresponding to each emitter's azimuth angular location would register a maximum (or near maximum) count. The average count in other counters 608 (those not corresponding to each emitter spatial angle) would be $$\frac{M}{2^n}$$

where M is the number of emitters. In order to differentiate the main lobes from the total average side lobe level, the main lobe should be on the order of 4 times the average side lobe level. Therefore $$\frac{2^n}{M} < 4 \text{ or } N < 2^{n-2}$$

Then a system with n=5 would have a finding capacity of about 8 emitters.

4. Lowering the Auto-Correlation Side Lobes

An upper bound on n for the interferometer is established by the signal-to-noise (S/N) ratio, and receiver measurement errors. The number of emitters that can be handled before the system saturates is in effect limited by the SIN ratio which results in reduced sensitivity. In order to lower the auto-correlation side lobes, a second antenna baseline and a second receiver (RF processor) are added as shown in FIG. 11.

Figure 11:
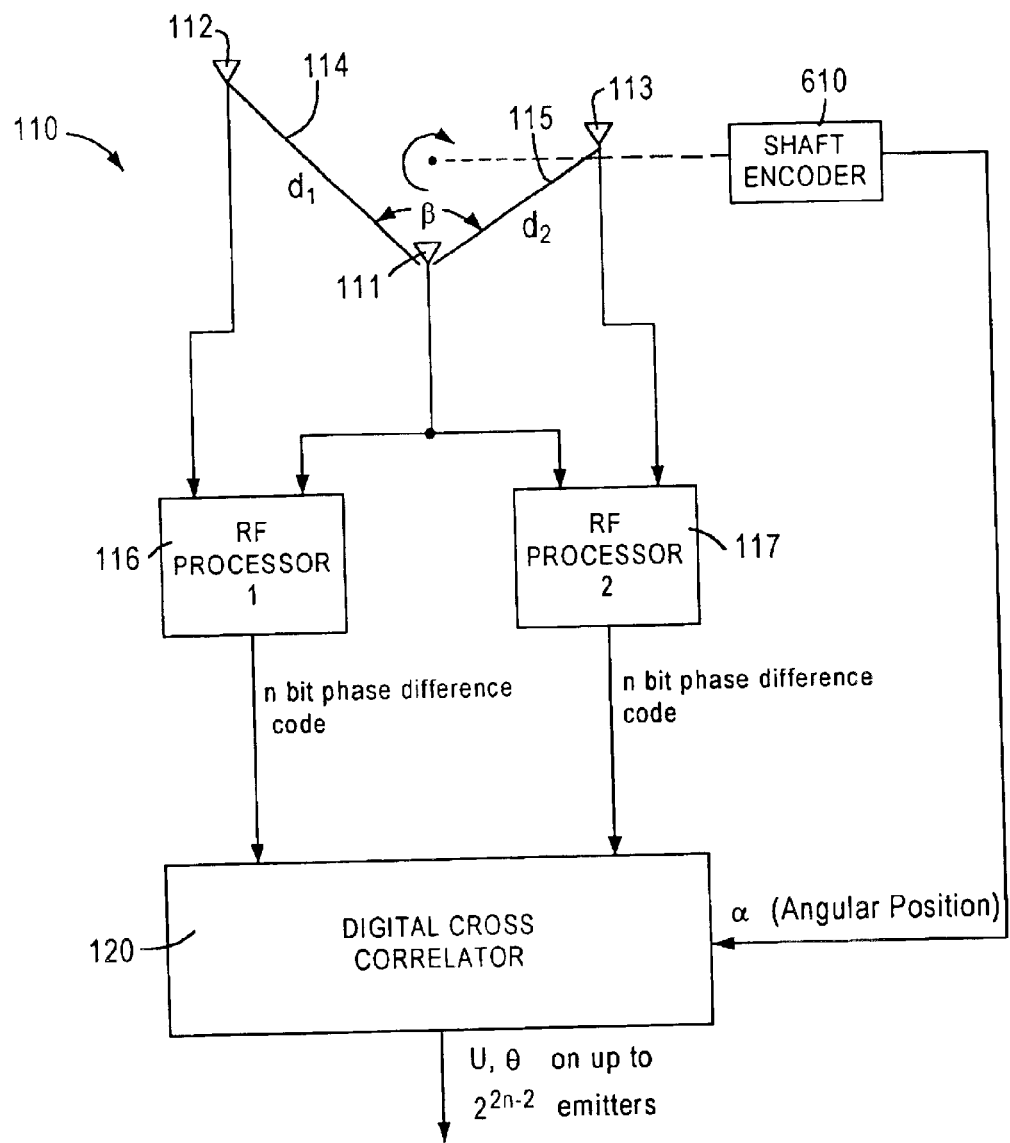
FIG. 11 is a schematic diagram of another embodiment of the system of the present invention having two revolving baselines.

In FIG. 11, a rotating interferometer system or antenna array 110 is formed with two baselines 114 and 115 having end-to-end spacing $d_1$ and $d_2$, respectively. Although baselines 114 and 115 may be formed from four individual antenna elements, it is sufficient to use only three antenna elements 111, 112 and 113. Signals from the shared antenna element 111 are supplied to both RF processors 116 and 117 corresponding to baselines 114 and 115, respectively. RF processors 116 and 117 are of a type similar to receiver 602 shown in FIG. 6, and need not be described in detail.

In one embodiment, both baselines 114 and 115 are driven by a single steering mechanism 604 (not shown) and a single encoder 610 is needed to feed the angular positions of antenna array 110 to the subsequent correlator circuit. In another embodiment (not shown), baselines 114 and 115 are driven separately by two steering mechanisms similar to steering mechanism 604, and two encoders similar to encoder 610 are needed to feed the angular positions of antenna array 110 to the subsequent correlator circuit.

Figure 12:
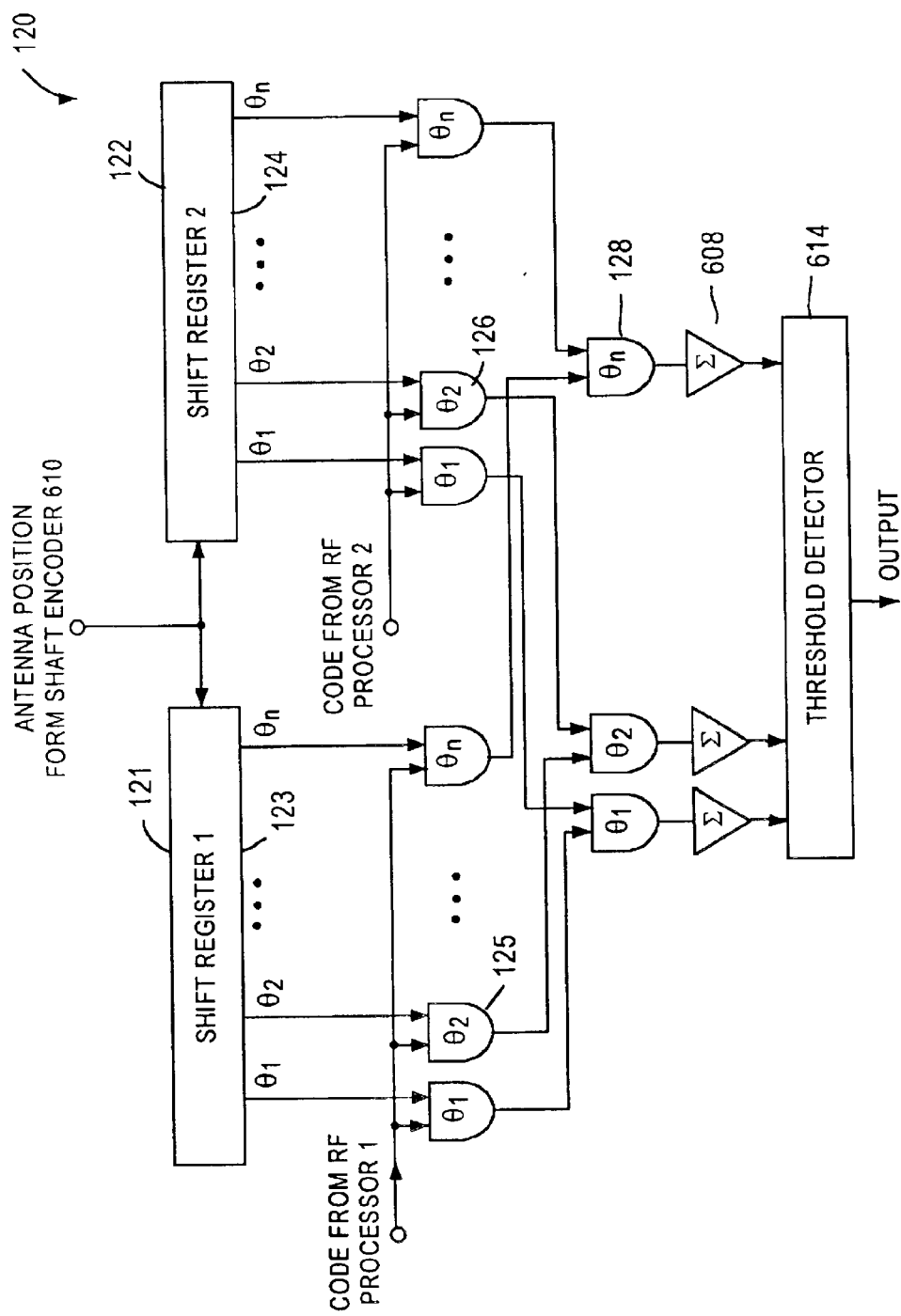
FIG. 12 is a schematic diagram of a digital cross-correlator for use with the embodiment shown in FIG. 11.

The subsequent correlator circuit or digital cross-correlator 120 is schematically depicted in FIG. 12. Digital cross-correlator 120 includes two channels 121 and 122. Each channel is almost identical to the correlator circuit shown in FIG. 6. That is, each channel comprises a shift register (123, 124) and a plurality of comparators (125, 126). Channels 121, 120 share a common set of AND gates 128, counters 608 and threshold detector 614.

Shift registers 123, 124 store the entire code pattern for 360° of azimuth for baselines 114, 115, respectively. Each of shift register 123, 124 is accessed at various cells corresponding to specific azimuth angular positions of the emitter or emitters. The received phase difference received from RF processors 116, 117 are compared, by comparators 125, 126, against the stored codes of the corresponding shift register 123, 124 for all accessed cells. A match must be obtained on each channel before a count is registered in a given counter 608. This is ensured by supplying the comparison results of each of comparators 125 and its counterpart 126 to one of AND gates 128. The counter 608 corresponding to the AND gate 128 is incremented by one count only when a match occurs in each of the comparator 125 and its counterpart 126. Threshold detector 614 outputs the actual azimuth angular position of the emitter in the manner described with respect to FIG. 6. In essence, correlation is performed in two channels in parallel.

Assuming each channel 121, 122 has the same number of quantization n. Then, the total number of bits available becomes 2n and the number of emitters that ran be handled (based on previous reasoning) before the system saturates is given by $$N=2^{2n-1}=(2^{n-1})^2 \quad (7)$$

By adding a third antenna or a second baseline, the capacity of the system is significantly increased. For example, a system with n=5 would now have a finding capacity of about 256 emitters. That is, 256 emitters can be simultaneously detected by rotating interferometer system 110 with adequate accuracy.

It has also been determined through computer modeling that the two baselines 114, 115 should not be equal in length, nor should they be co-linear to obtain the lowest side-lobe-to-main-lobe ratios. The ratio $d_1/d_2$ is preferably in the range between 1 and 2, and the angle $\beta$ is preferably in the range between 40 and 70 degrees. The concept can be extended to more than two baselines by adding more antennas and more receivers, and performing correlation in parallel as described for the two baseline case.

5. Determination of Both U and $\theta$

Figure 13:
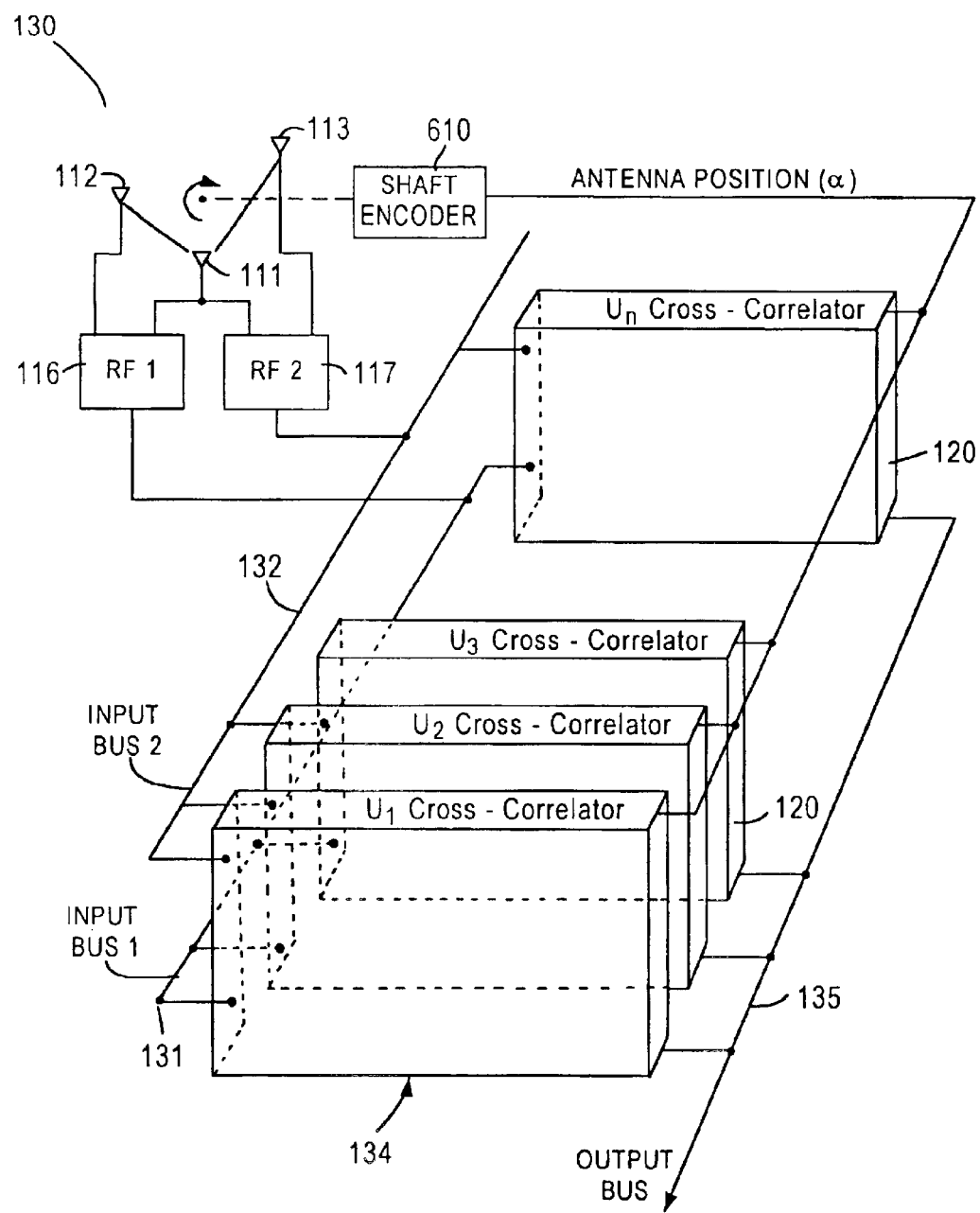
FIG. 13 is a schematic diagram of still another embodiment of the system of the present invention using a two-dimensional cross-correlator.

Up to this point the discussion has been restricted to finding the direction of emitters at a particular frequency f and elevation angle $\phi$ (the same value of U). To determine both U and $\theta$, a two dimensional correlation must be performed, e.g. in a system 130 shown in FIG. 13. Each of the cross-correlators 120 shown in FIG. 13 is identical to that shown in FIG. 12. However shift registers 123, 124 in each cross-correlator 120 have different codes stored in them corresponding to the value of U for the particular correlator with which the shift register pair is associated. Shift registers 123, 124 of each cross-correlator 120 are connected to their respective RF processors 116, 117 via a corresponding input bus 131, 132. The outputs of threshold detectors 614 of cross-correlator 120 are consolidated into an output bus 135. For each emitter, only the counter in the cross-correlator corresponding to the actual $\theta$ and U values, respectively, of the emitter will have a maximum count.

Again, it should be understood that more than two baselines can be used in the above two dimensional interferometer system by adding more antennas, receivers and shift registers to each of the cross-correlators. Likewise, the two dimensional interferometer system shown in FIG. 13 does not necessarily have two or more baselines. One base line should also be sufficient to simultaneously determine both $\theta$ and U values of one or more emitters. As discussed above, adding more baselines and correlation channels, however, helps to enhance the system accuracy and finding capability.

Again, the two dimensional interferometer system can be realized in a software implementation in the manner described above.

6. Determination of Elevation $\phi$ and Frequency f

It has been shown in Sections 1 and 2 that if the interferometer is rotated such that the baseline is always in a plane (i.e. azimuth plane), the phase difference is given by equation (8):

$$\psi=2\pi s(1+k)\cos\phi_e \sin(\theta_e-\alpha) \quad (8)$$

where $\phi_e$ and $\theta_e$ are the emitter elevation and azimuth angles, respectively. It was also noted in Section 3 that either frequency f or elevation angle $\phi$ can be obtained if the other is known, but both cannot be obtained along with emitter azimuth angle $\theta$ by rotating the interferometer in a plane.

Figure 14:
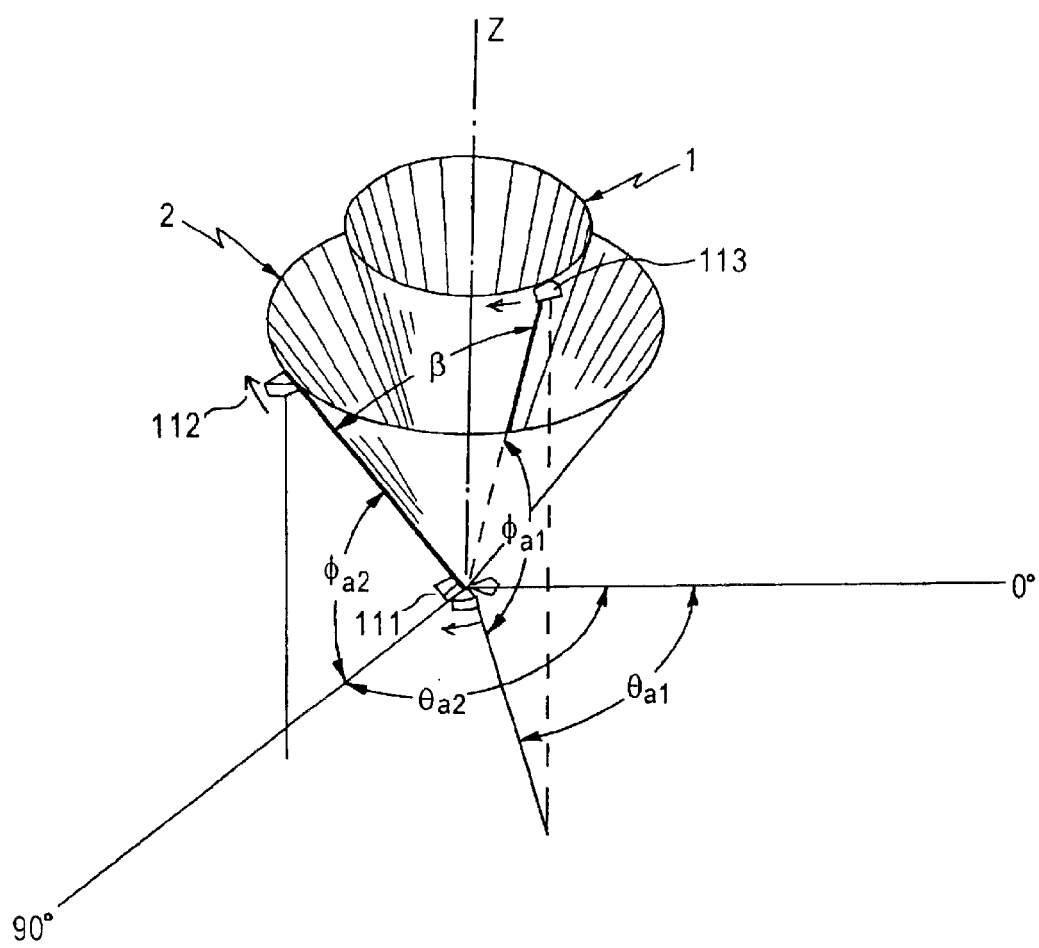
FIG. 14 is three-dimensionally rotating array geometry showing two baselines of the system of the invention in three dimensional movement.

If the interferometer is rotated such that its baseline (or baselines) lies on a conical surface (or surfaces) as shown in FIG. 14, then the relative phase difference between the two antenna elements of the baseline is given by equation (9).

$$\psi=2\pi s(1+k)[\cos\phi_a \cos\phi_e \cos(\theta_e-\theta_a)+\sin\phi_a \sin\phi_e] \quad (9)$$

where $\phi_a$, is the elevation angle of the baseline and $\theta_a$ is the azimuth angle of the baseline with respect to the azimuth plane. Apparently, steering mechanism or mechanisms 604 in this case must be able to drive the antenna array in three dimensional movement.

The subscripts 1, and 2 in FIG. 14 refer to the two interferometers which are used jointly in the same manner as the system of FIG. 11. In general the spacing between the two antenna elements of each interferometer is different (as in FIG. 11). The phase difference code for each interferometer is given by (10.1) and (10.2)

$$N_1=Int\{2^n(1+k)s_1[\cos\phi_{a1}\cos\phi_e \cos(\theta_e-\theta_{a1})+\sin\phi_{a1}\sin\phi_e]Modulo2^n\}_1 \quad (10.1)$$

If $Int\{\ \}_1<0$, then $N_1=2^n-1+Int\{\ \}_1$ $$N_2=Int\{2^n(1+k)s_2[\cos\phi_{a2}\cos\phi_e \cos(\theta_e-\theta_{a2})+\sin\phi_{a2}\sin\phi_e]Modulo2^n\}_2 \quad (10.2)$$

If $Int\{\ \}_2<0$, then $N_2=2^n-1+Int\{\ \}_2$.

Figure 15:
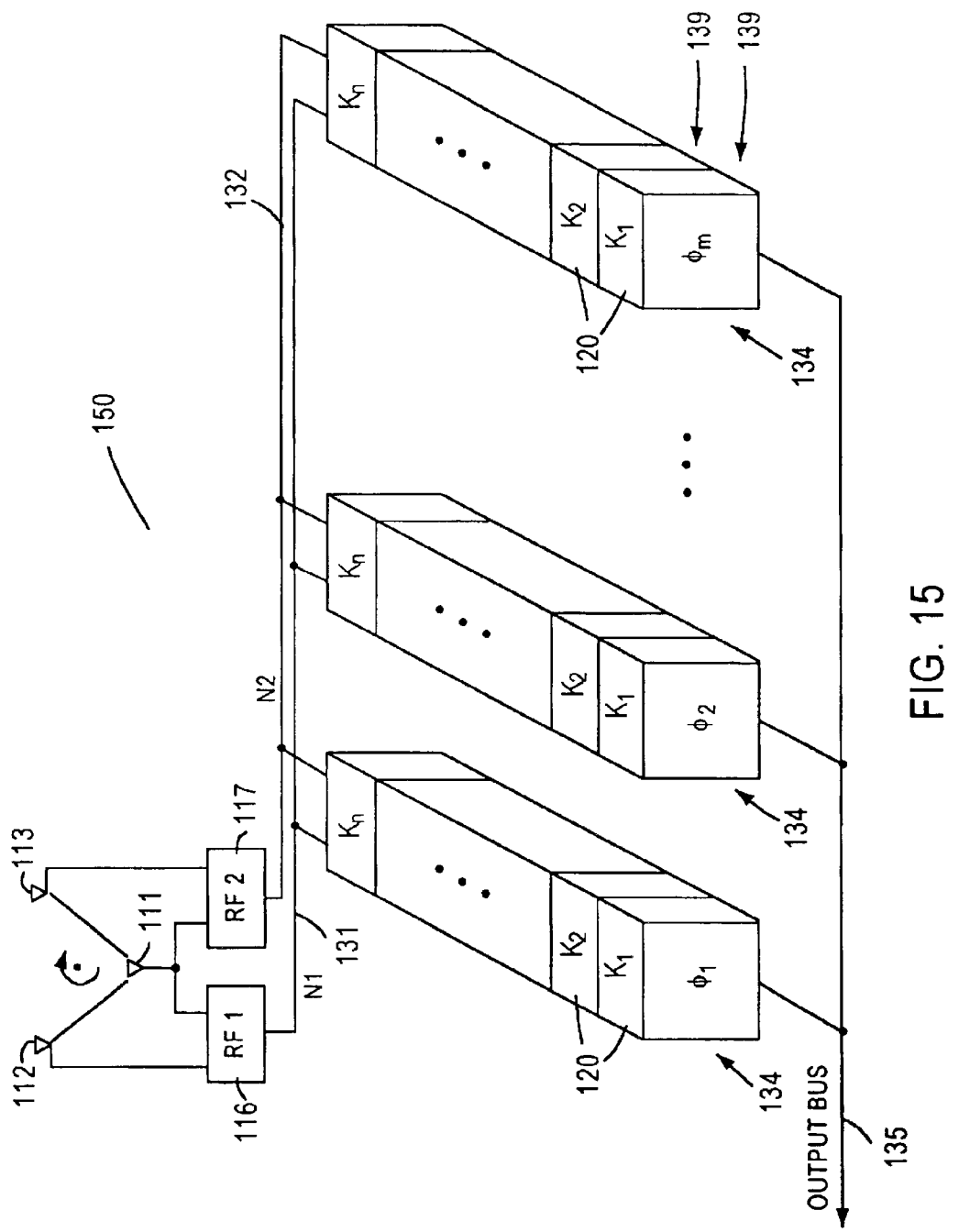
FIG. 15 is a schematic diagram of yet another embodiment of the system of the present invention using a three-dimensional cross-correlator.

Azimuth and elevation angles and frequency would be determined by cross-correlators similar to that shown in FIG. 12. The system could be organized as shown in FIG. 15. In FIG. 13, the correlator circuit includes a column 134 of a plurality of cross-correlator of the type shown in FIG. 12. In FIG. 15, the correlator circuit includes a plurality of columns 134 each corresponding to a specific value of one of the parameters of the emitters, i.e. elevation angle $\phi$. Each cross-correlator 120 in a column 134 corresponds to a specific value of one of the remaining parameters of the emitters, i.e. frequency f (or k). Thus, each cross-correlator 120 has a code pattern stored in its shift registers corresponding to the particular frequency and elevation angle $(k_i,\phi_j)$ for which the cross-correlator is matched. The code is obtained from equations (10.1) and (10.2) for each shift register respectively. Thus, three dimensional correlation is performed in this case.

If frequency f is known e.g. by virtue of using superheterodyne receivers), then each column 134 will have only one cross-correlator 120, and only a single row 139 is required. If elevation angle $\phi$ is known (e.g. by using directional antenna elements responsive only to radiation incident to the antenna array at a particular elevation angle), then only a single column 134 is required. In each instance, system 150 is simplified to have the form of system 130.

Again, more than two baselines can be used in the above three dimensional interferometer system by adding more antennas, receivers and shift registers to each of the cross-correlators. Likewise, one base line should be sufficient to simultaneously determine all three parameters $\theta$, $\phi$ and f of one or more emitters.

Again, the three dimensional interferometer system can be realized in a software implementation in the manner described above.

It should be understood that the system and method of the invention is not limited to determination of azimuth, elevation and frequency of a wave-front. Instead, the system of the invention is capable of determining any parameter of a radiating source which can be detected by antenna elements of a revolving antenna array as long as the parameter can be expressed as a function of spatial position of the antenna array and phase difference induced in the antenna elements.

Moreover, azimuth, elevation and frequency play interchangeable roles, especially in the software implementation of the invention. For example, the multi-dimensional table or database which stores a vast number of [N,α] sets each corresponding to a particular set of (θ, φ, f) values may be indexed in any desired order, e.g. first by elevation angle φ, then by azimuth angle θ, and finally by frequency f. Alternatively, the multidimensional table or database may be indexed to present a vast number of [θ, φ, f] sets, each corresponding to a particular pair of (N, α). A comparison software module then compare each stored (N, α) pair with the data received from the system's receivers and encoders to highlight the [θ, φ, f] sets corresponding to the matched (N, α) pair. The particular [θ, φ, f] set which is most frequently highlighted will be outputted as actual parameters of the wave-front. Apparently, the parameters θ, φ, and f are treated equally in this embodiment.

The method and system of the present invention have many advantages over the known direction finding technique. For example, a single antenna array, instead of four arrays, is sufficient to cover 360° spatially. Moreover, it is sufficient to rotate the system's antenna array through an angular sector on the order of 60 to 90 degrees. Upon completion of the rotation, frequency and direction of arrival are available on all emitters within the angular sector. The information is also available continuously as the antenna array rotates. The system finding capacity, i.e. the number of emitters for which the system can measure frequency and direction of arrival, can be predetermined based on the precision of the electrical phase difference measurement, and the number of antenna elements utilized.

In addition, the technique of the present invention involves far less antenna and receiver hardware than the fixed (non-rotating) interferometer system. Though, the system of the invention cannot determine direction of arrival on a single pulse, after a single rotation of the antenna array, the frequency and direction (both azimuth and elevation) on all emitters within the system's operating band and sensitivity will be available. The complexity of the system, in the hardware embodiments, lies in the digital circuitry which performs the necessary cross-correlation for direction of arrival and frequency determination. The greater the system resolution in frequency and direction of arrival, the greater the digital complexity (in terms of number of digital circuits). In contrast, the conventional interferometer must add antenna and receiver channels to achieve better angular resolution.

While there have been described and illustrated specific embodiments of the invention, it will be clear that variations in the details of the embodiments specifically illustrated and described may be made without departing from the true spirit and scope of the invention as defined in the appended claims.

What is claimed is:

1. A method of determining at least one parameter of a radiating source, based on a plurality of spatial positions of an antenna array and relational phases between signals generated by the radiating source in first and second antenna elements of the antenna array at said plurality of spatial positions, the method comprising the steps of:

for each potential value of said at least one parameter, predicting a set of corresponding spatial positions and relational phases;

moving the antenna array through said plurality of spatial positions;

while moving the antenna array, measuring actual relational phases at each of said plurality of spatial positions to generate a set of measured spatial positions and relational phases;

comparing the measured set with each of the predicted sets to find a best-matching predicted set; and determining an actual value of said at least one parameter based on the best-matching predicted set.

2. The method of claim 1, further comprising the step of reporting presence of said radiating source upon detecting a predicted set satisfying a best-matching condition.

3. The method of claim 2, further comprising the step of reporting presence of multiple radiating sources upon detecting multiple predicted sets satisfying the best-match condition.

4. The method of claim 1, wherein the antenna array rotates through said plurality of spatial positions with a boresight direction of the antenna array remaining coplanar and sweeping out an angular arc during said rotating.

5. The method of claim 1, wherein the antenna array rotates through said plurality of spatial positions with a boresight direction of the antenna array sweeping out a conical surface during said rotating.

6. A method of determining a parameter of at least one radiating source using an antenna array having first and second antenna elements, comprising the steps of:

a) when the antenna array is set at a particular angular position, predicting, for each potential value of said parameter, a relational phase that would be generated between signals induced by any of said at least one radiating source in the first and second antenna elements;

b) storing the predicted relational phases in a plurality of memory cells each being associated with a potential value of said parameter;

c) starting from a beginning angular position, rotating the antenna array for an angular interval;

d) shifting contents of the memory cells corresponding to said angular interval;

e) measuring an actual relational phase between signals induced in the first and second antenna elements;

f) matching the actual relational phase with the content of each of the memory cells;

g) repeating steps (c), (d), (e), and (f) while accumulating a number of matches for each of the memory cells, until the antenna array has reached an ending angular positions;

h) evaluating the number of matches of each of the memory cells against a criterion; and i) outputting the potential value or values associated with those of the memory cells that satisfies the criterion as actual value or values of said parameter of said at least one radiating source.

7. The method of claim 6, wherein said parameter comprises an azimuth angle of a direction of propagation of radiation, transmitted by said at least one radiating source toward the antenna array, with respect to an azimuth plane of the antenna array.

8. The method of claim 7, wherein the first and second antenna elements are located and rotated in the azimuth plane.

9. The method of claim 7, further comprising the step of determining either of a radiation frequency of said at least one radiating source and an elevation angle of the direction of propagation with respect to the azimuth plane of the antenna array.

10. The method of claim 5, wherein the beginning and ending angular positions spaced from about 60 to about 90 degrees.

11. The method of claim 5, wherein said at least one radiating source is swept over by the antenna array during the movement thereof from the beginning angular position to the ending angular position.

12. The method of claim 5, wherein said particular angular position is a zero degree position.

* * * * *